United States Patent [19]
Schaeff

[11] 3,765,553
[45] Oct. 16, 1973

[54] VEHICLE WITH TWO EARTHWORKING ATTACHMENTS

[76] Inventor: Hans Schaeff, 7183 Langenburg, Langenburg, Germany

[22] Filed: Apr. 26, 1971

[21] Appl. No.: 137,431

[30] Foreign Application Priority Data
May 8, 1970 Germany.................... P 20 22 427.5

[52] U.S. Cl............................ 214/138 R, 280/111
[51] Int. Cl............................................... E02f 3/00
[58] Field of Search ............... 180/51, 41; 280/111, 280/112; 214/140, 778, 138

[56] References Cited
UNITED STATES PATENTS

| | | |
|---|---|---|
| 3,370,730 | 2/1968 | Fielding .............................. 214/778 |
| 3,526,329 | 9/1970 | Anderson............................. 214/140 |
| 3,272,280 | 9/1966 | Schuetz............................... 214/140 |
| 3,426,720 | 2/1969 | Enos .................................. 280/111 |
| 3,572,746 | 3/1971 | Mueller............................ 280/112 R |

Primary Examiner—Gerald M. Forlenza
Assistant Examiner—John Mannix
Attorney—Arthur Schwartz

[57] ABSTRACT

A vehicle having two earthworking attachments thereon including a vehicle frame on a pair of axles, one of which being steerable. The frame includes two frame units each connected to a working unit and an axle. The two frames are rotatably connected together.

14 Claims, 6 Drawing Figures

INVENTOR.
HANS SCHAEFF

VEHICLE WITH TWO EARTHWORKING ATTACHMENTS

BACKGROUND OF THE INVENTION

1. Field of the Invention

The invention relates to earth working vehicles, and in particular to vehicles with two earth working attachments. Such examples are a loading shovel attached to a lifter frame and a ditch scoop attached to the other end of the vehicle, the latter being supported on the ground over two axles, at least one of which being steerable.

2. Description of the Prior Art

In order to improve the utilization of carrier vehicles for earth working attachments and for attainment of quick adaptability to working conditions, it has been known to use special attachments, such as shovel attachments, earth drilling attachments, or crane attachments which can be mounted to the rear end of shovel loaders or tractors. Such vehicles have a rigid front axle and a jointed, cross-shaft rear axle in order to permit the shovel loader to work exactly in the vehicle plane so as to obtain the most favorable response of the vehicle to the reaction forces created by the shovel. Thus, the loading shovel mounted forward of the front axle is well supported by the vehicle. However, this is not the case with a second earth working attachment mounted behind the jointed, cross-shaft axle, especially in the case where the latter is also movable laterally or where the vehicle is operated with the arm of the attachment in its extreme lateral position. In a situation where the ground is uneven, such an unbalanced loading condition of the vehicle behind its jointed axle may create a force distribution so uneven as to cause the vehicle to tip over.

With so-called tractor loaders, the loading shovel is normally attached to the front end of a closed tractor whose front axle normally is a jointed, cross-shaft axle with steerable wheels. While in this case any earth working attachment mounted behind the rigid rear axle would function better than in the previously mentioned example of the shovel loader, the jointed front axle creates very unfavorable supporting conditions for the front loading shovel making it impossible for the loading shovel to be accurately guided. This is in addition to the danger of the vehicle tipping over when the loading force is one-sided.

SUMMARY OF THE INVENTION

It is an objective of the present invention to provide a vehicle for the use with two earth working attachments, particularly one having a shovel and a scoop. It is designed for high work efficiency and for the use of both earth working attachments. In contrast to known comparable vehicles, it is capable of travelling at adequately high speeds over a roadway. The device thereby provides the most efficient utilization of the work capacity of the attachments, even when switching between different work locations. This objective is obtained by the invention in that it provides a shovel loader of the earlier mentioned type, the frame of which consists of two separate frame units, whereby each unit is connected to a rigid axle while carrying one earth working attachment. The two units are rotatably linked to one another on a longitudinal axis located in the vertical center plane of the vehicle.

Preferably, the rotatability of the two frame units relative to one another is controlled by either two single action hydraulic cylinders or one double action hydraulic cylinder. For example, the single acting hydraulic plunger cylinders may be interconnected by means of a hydraulic conduit equipped with a three-way valve. The valve either creates a free connection between the two cylinder spaces, or a throttled flow. Alternatively, it can completely block the connection. This will depend upon whether the vehicle is positioned on uneven ground where an unrestricted freedom to roll is desirable, or whether the vehicle is travelling on a normal roadway where a limited rotational mobility of the two frame units in the throttle position of the hydraulic controls is possible. During earth moving operations, on the other hand, the hydraulic system is blocked, thus providing an excellent support on all four wheels of the vehicle.

The invention further illustrates in a preferred embodiment the rotational axis of the two frame units being concentric with the motor drive shaft. The rotational connection may be, for example, in the form of an annular bearing surrounding the axis. For good weight distribution on the vehicle, the motor is mounted on the forward frame unit, and the transmission and operator's seat are part of the rear frame unit. In this manner, the two frame units are rotatably linked together on a comparatively elevated rotational axis. In addition to the large ground clearance thereby obtained, the axis may be increased still further by the use of gantry axles. This feature gives good lateral stability when the vehicle travels over roadway curves at high speeds since the rotational connection is located approximately at the level of the center of gravity, or at least in its vicinity, so that the centrifugal forces created on the vehicle cause only a small kinking or pitching moment around the rotational connecting axis.

The rotational connection permitting the freedom of roll between the two vehicle units consists of an annular bearing which may be arranged concentrically with the drive shaft of a centrally mounted motor. Alternatively, it consists of a cantilever trunnion which is supported on a long shank, or it may consist of two smaller pivot trunnions which are used to support the two frame units which extend into one another so that the trunnions can be arranged at a greater longitudinal distance from one another.

BRIEF DESCRIPTION OF THE DRAWINGS

Further advantages of the invention will become apparent from the description below, when taken together with the accompanying drawings which illustrate, by way of examples, several preferred embodiments of the invention represented in the various figures as follows.

DESCRIPTION OF THE PREFERRED EMBODIMENTS

Figure 1:
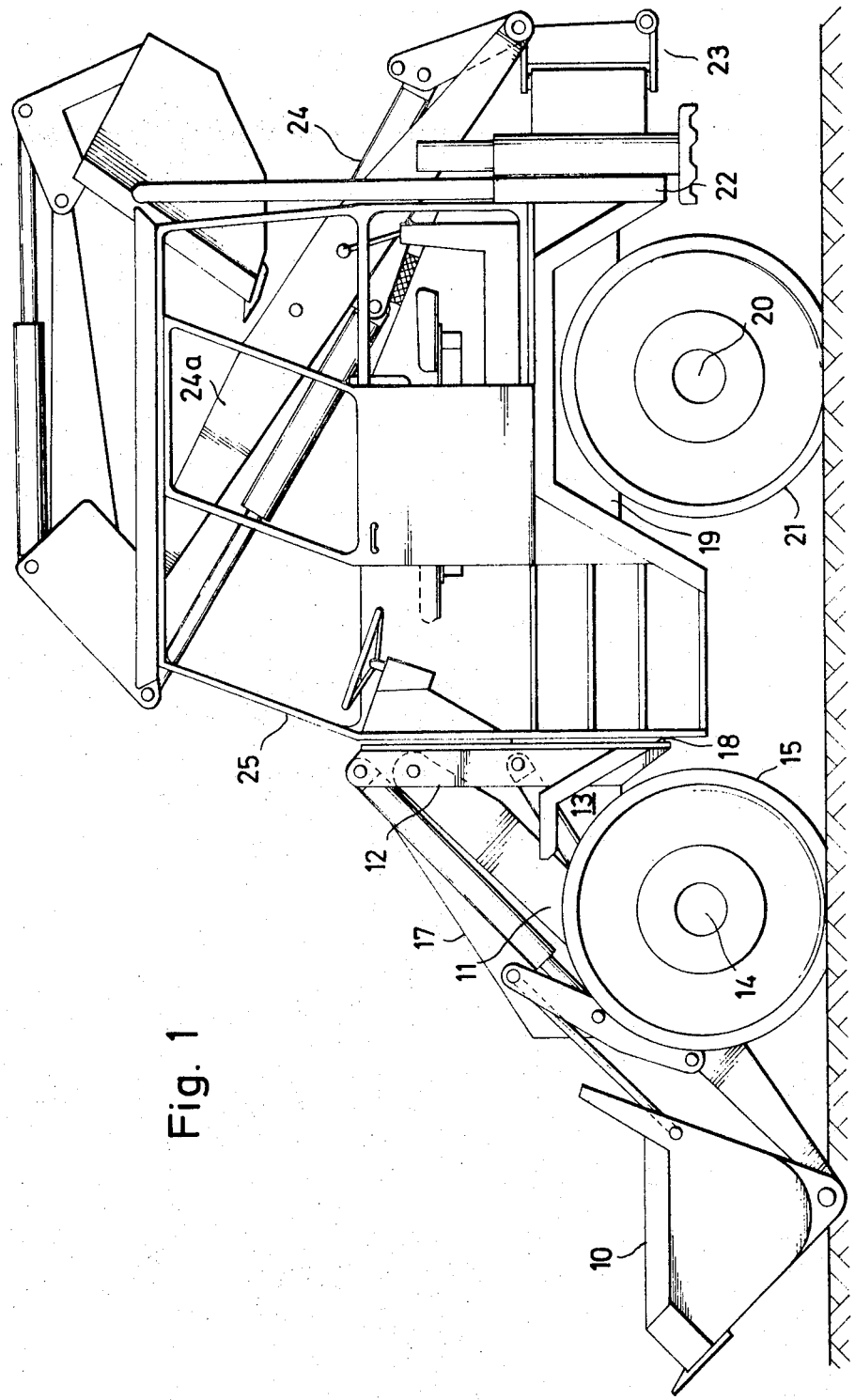
FIG. 1 is a front view elevation of a vehicle embodying the invention.
Figure 2:
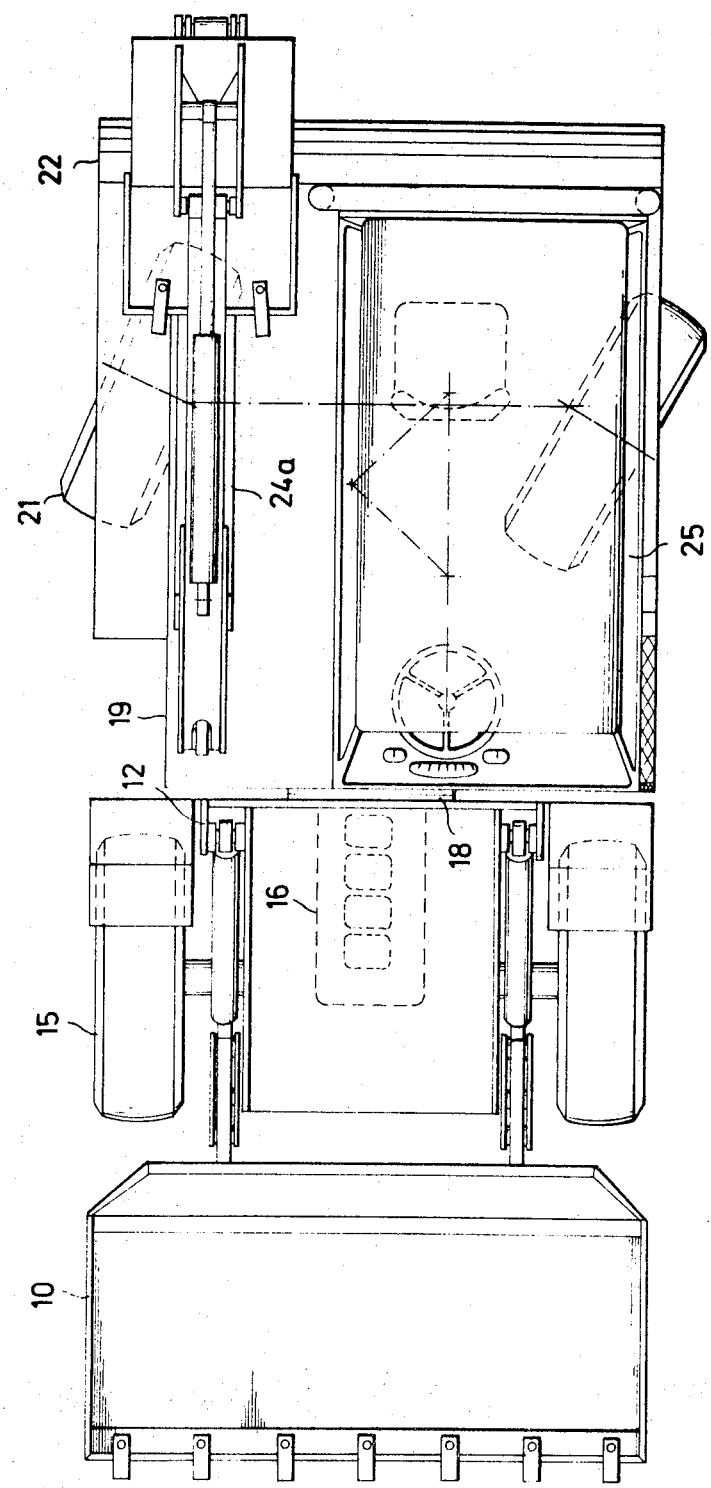
FIG. 2 is a plan view of the vehicle shown in FIG. 1, the embodiment including an annular bearing as a connection between the frame units.
Figure 3:
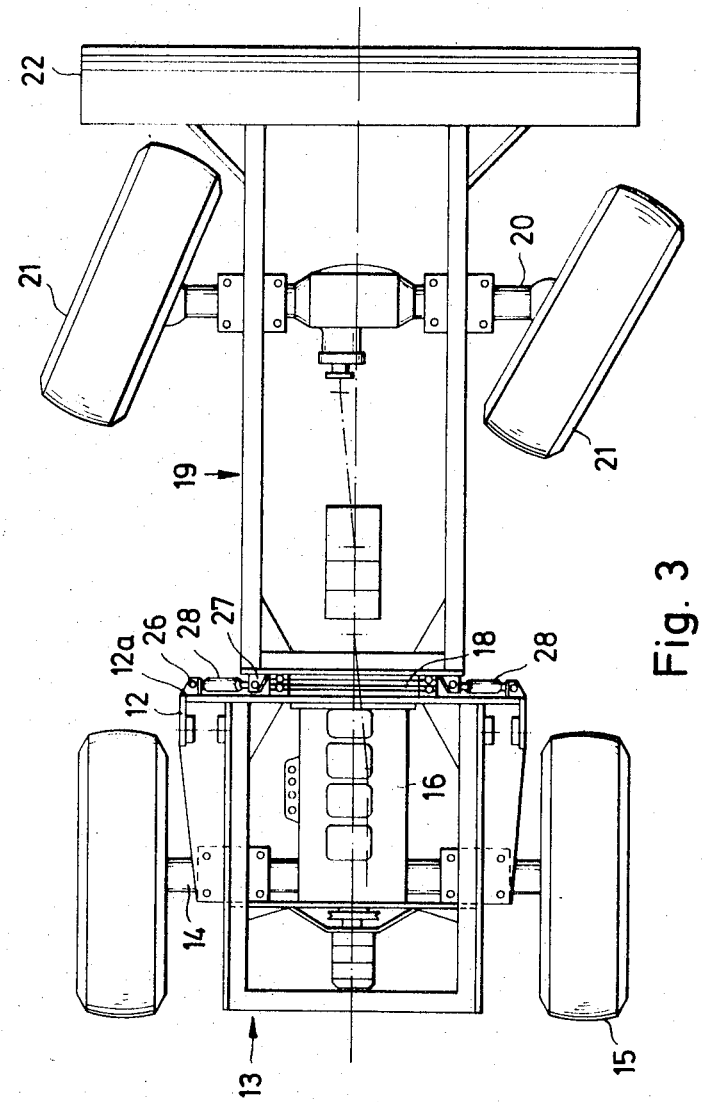
FIG. 3 is a plan view similar to that of the FIG. 2, showing in particular the means used to control the relative rotatability between the two frame units.

As can be seen in FIGS. 1 – 3, the vehicle of the invention comprises on its forward extremity a shovel 10 which is linked to vertical supports 12 by means of a lifter frame 11. The vertical supports 12 are connected on their upper ends by a cross bar 12a, as visible in FIG. 3, and extend upwardly from a forward unit 13 to which is mounted a rigid front axle 14 having wheels 15. On the frame unit 13 is also mounted the vehicle motor 16 which, as can be seen in FIG. 1, is covered by a forwardly slanting motor hood 17. The lifter frame 11 of the shovel is vertically pivotable in the space between the motor hood and the wheels.

To the forward frame unit 13 is connected a rear frame unit 19 by means of an annular bearing 18 which is arranged concentrically around the motor drive shaft located longitudinally in the vertical center plane of the vehicle. To the rear frame unit 19 is connected a rigid rear axle 20 having steerable wheels 21. In addition, the rear frame unit 19 carries, in the example shown, a transversely extending mounting frame 22 on which is guided for lateral motion the vertical pivot column 23 of a ditch scoop 24. For a favorable weight distribution over the two rigid axles 14 and 20, the rear frame unit 19 also carries the transmission 25, together with the driver's cabin 24a which is arranged laterally alongside the shovel arm which can be pivoted back over the vehicle (see FIG. 2).

The off-center driver's cabin 22 (see FIG. 2) is located as near as possible to the frame 12, 12a for the support of the loading shovel so as to give a good visual control over the two work attachments. An over-sized motor or a larger (V-) motor which cannot be accommodated inside the lifter frame can also be placed alongside the driver's cabin if necessary. For weight distribution, the hydraulic components, fuel tank, and other components would then be located in the former location. Alongside the driver's cabin remains room for such work attachments as the shovel, a mast erector unit, earth drill, etc. which are retracted during travelling.

As a result of the separation of the two frame units as near as possible to the loading shovel, the vehicle can have a short overall length, and, together with the off-center location of the driver's cabin, the vehicle becomes compact and still offers storing space for the rear earth working attachment when the latter is folded back.

As can be seen in the FIG. 3, controls may be provided between the two frame units 13 and 19 in the form of hydraulic cylinders, preferably single acting plunger cylinders 28 which are linked to ears 26 and 27 arranged at different levels on frame unit 13 and frame unit 19, respectively. The cylinders 28 are interconnected by means of a hydraulic system, whereby the relative roll between the frame units can be either limited, completely blocked or merely throttled.

Figure 4:
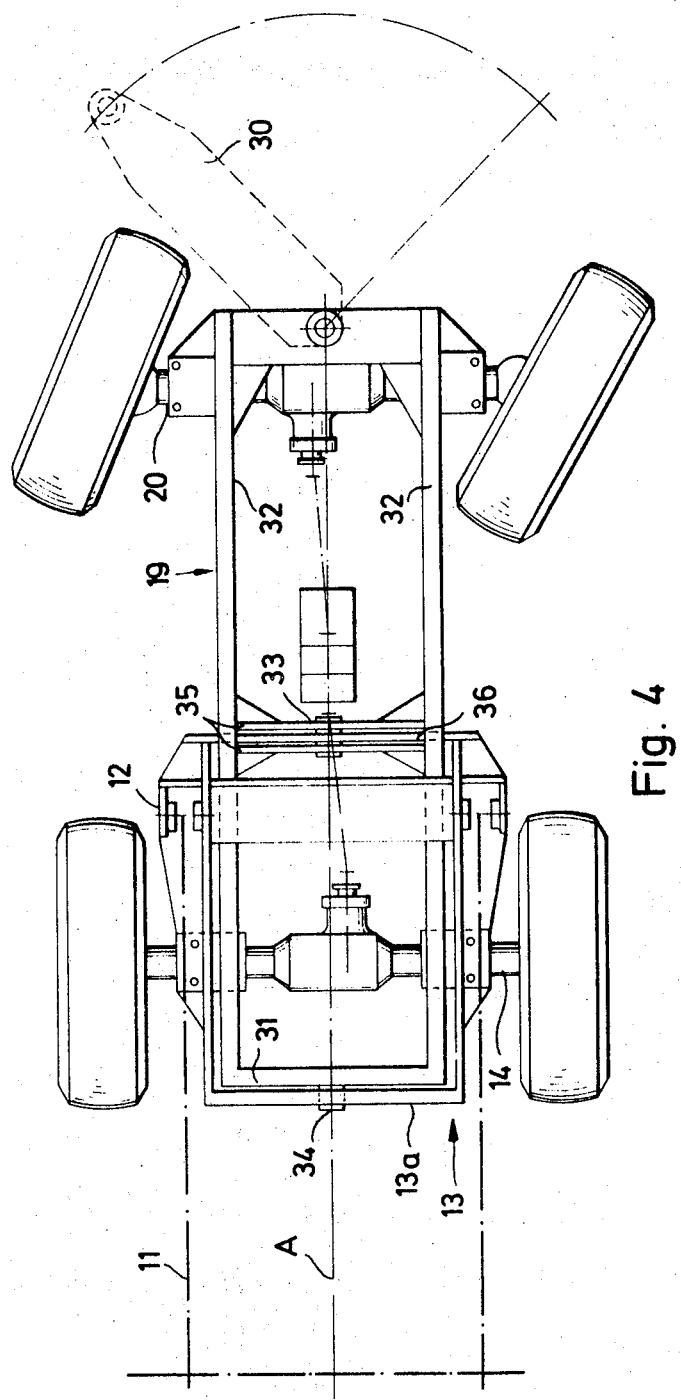
FIG. 4 is a plan view of a vehicle frame according to another embodiment of the invention where the two frame units extend into one another.
Figure 5:
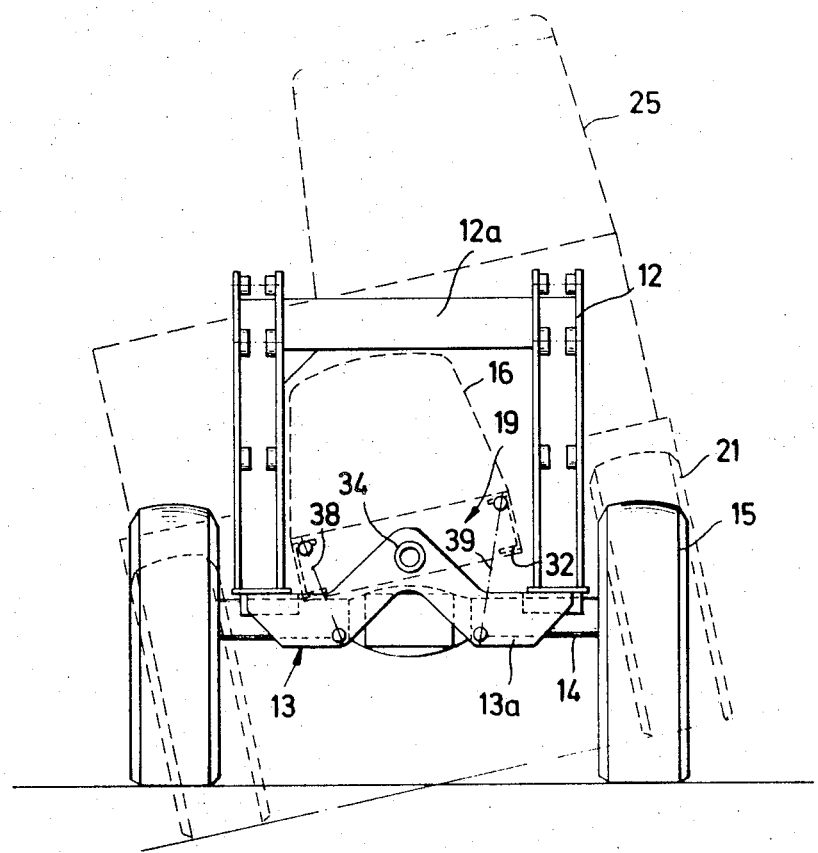
FIG. 5 is a simplified front end view of the vehicle indicated in FIG. 4.

In a different embodiment shown in FIG. 4 the rear frame unit 19 carries a horizontally pivotable support arm 30 to which may be attached, for example, a shovel arm or a similar unit. The frame unit 19 includes longitudinal frame members 32 interconnected by a transverse frame member 31. The frame thus constituted extends forwardly into the frame unit 13, the two frame units being pivotably connected to one another in the vertical central plane A of the vehicle by means of two pivot trunnions 33 and 34 which are located on the same level. The transverse frame elements 13a and 36 of FIG. 4 are provided with a double offset shape as illustrated in FIG. 5, the frame unit 19 and its tranverse elements 31 and 35, respectively, being attached thereto. In this case, the motor 16 (FIG. 5) is mounted on the frame unit 19. Sufficient space for roll mobility is provided inside the support structure for the shovel lifter frame to allow relative rotational motion even on extremely uneven ground to a roll position as shown by dotted lines in FIG. 5. The motor drive shaft is not coaxial with the pivot trunnion 34, although in principle this could be achieved by using a pivot sleeve. FIG. 5 further indicates schematically, by means of the lines 38 and 39, the position of the hydraulic control cylinders which are linked to frame units 19 and 13, respectively.

Figure 6:
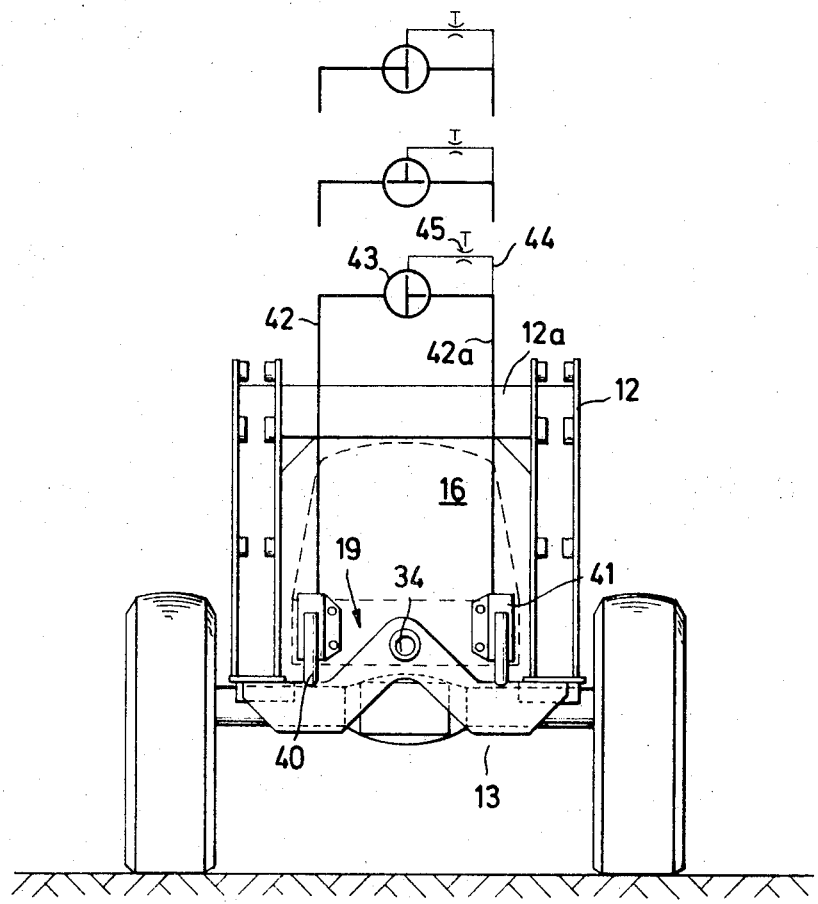
FIG. 6 is similar to FIG. 5 and shows schematically the hydraulic means used for the control of two cylinders for the control of vehicle roll.

As can be seen from FIG. 6, the free ends of the plungers 40 of the hydraulic cylinders extend downwardly until they contact the forward frame unit 13, while the cylinders 41 are rigidly connected to the rear frame unit 19 which extends into the frame unit 13. The cylinders 41 are interconnected by means of hydraulic lines 42 and 42a to a three-way valve 43 indicated schematically in the drawing. A parallel line 44 with a throttle 45 connects one leg of the hydraulic line 42a to the three-way valve 43. The drawing shows three different valve positions, the lowest one showing the connection between the cylinders 41 completely blocked. This position is used for work with an attachment which is horizontally pivotable with its load. The valve position shown in the middle of FIG. 6 is used when the vehicle is travelling on uneven terrain and when the rigid axles of the two frame units must adapt quickly to the terrain changes. In the uppermost valve position shown in FIG. 6 the two cylinders 41 are interconnected only via parallel line 44 and throttle 45, thereby giving the effect of an adjustable shock absorbing device. This operational position is used for rapid travel on a roadway, the two frame units being thereby connected relatively rigidly. The use of large profile tires makes it possible for three-point ground contact for only short periods of time.

It should be understood that the embodiments of the invention as shown are not limited to a loading shovel and ditch scoop combination; rather it is easily seen that other combinations of a vehicle with two work attachments are possible, for example, a combination of a crane and loader, a mast erector unit and a shovel, an earth drill and a crane, or a crane and a winch.

While there has been described and illustrated specific embodiments of the invention, it will be clear that variations in the details of the embodiments specifically illustrated and described may be made without departing from the true spirit and scope of the invention as defined in the appended claims.

I claim:

1. A vehicle having two working units comprising:
   a. a frame supported on the ground by means of axles of which at least one axle is steerable;

b. said frame including two frame units, each of said frame units being connected to a working unit and to an axle, at least one of said working units having a horizontally swinging boom;

c. said frame units including means for pivotally connecting them together about a longitudinal axis;

d. means for hydraulically controlling the ease of pivotal movement of the two frame units relative to each other at any position thereof;

e. said controlling means including a pair of hydraulic cylinders, a conduit means connecting said cylinders, and a three-position valve in said conduit means between said cylinders;

f. said three-position valve having a first position for effecting hydraulic communication between said cylinders thereby permitting free relative pivotal movement between said frame units;

g. said valve having a second position for throttling the flow of hydraulic fluid between said cylinders thereby permitting restrained pivotal movement between said frame units, and;

h. said valve having a third-position for blocking the flow of hydraulic fluid between said cylinders in any relative position of said frame units thereby locking said frame units together in any relative position.

2. A vehicle as defined in claim 1 wherein said axis is located in the vertical central plane of the vehicle.

3. A vehicle as defined in claim 1 wherein at least one of said working units is an earth working type.

4. A vehicle as defined in claim 1 wherein the connections between said frame units and working units are rigid.

5. A vehicle as defined in claim 1 wherein said pair of hydraulic cylinders is included in one double-acting hydraulic cylinder.

6. A vehicle as defined in claim 1 wherein said cylinders are plunger-cylinders linking said two frame units to each other, the cylinders being attached to one frame unit while free ends of the plungers projecting from the cylinders abut against the other frame unit.

7. A vehicle as defined in claim 1 wherein said means for pivotally connecting said frame units together includes an annular bearing concentrically surrounding a motor drive shaft about said axis.

8. A vehicle as defined in claim 1 wherein one of said frame units extends into the other of said frame units and is pivotally connected thereto by means of a pair of pivot trunnions.

9. A vehicle as defined in claim 1, wherein said connecting means includes a pivot trunnion extending from one frame unit and supported in the other frame unit by means of two longitudinally spaced pivot bearings.

10. A vehicle as defined in claim 1 including a forward axle on one frame unit, a motor and a shovel lifter frame arranged above said forward axle, each mounted on different frame units.

11. A vehicle as defined in claim 1 including a pair of rigid axles.

12. A vehicle as defined in claim 1 wherein said frame units include cross frame elements, at least some of which have a double offset in the center thereof, said frame units connected to each other at said center by means of pivot means.

13. A vehicle as defined in claim 1 including a driver's cab positioned off-center of said vehicle for the accommodation of a working tool which is pivoted upward and backward into a non-working, travelling position.

14. A vehicle as defined in claim 1 including a driver's cabin positioned between a supporting means for a loading shovel and a working attachment.

* * * * *